United States Patent
Wetherbee et al.

(10) Patent No.: US 11,341,588 B2
(45) Date of Patent: May 24, 2022

(54) USING AN IRRELEVANCE FILTER TO FACILITATE EFFICIENT RUL ANALYSES FOR UTILITY SYSTEM ASSETS

(71) Applicant: Oracle International Corporation, Redwood Shores, CA (US)

(72) Inventors: Edward R. Wetherbee, Omaha, NE (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 447 days.

(21) Appl. No.: 16/560,629

(22) Filed: Sep. 4, 2019

(65) Prior Publication Data

US 2021/0065316 A1    Mar. 4, 2021

(51) Int. Cl.
*G06Q 50/00* (2012.01)
*G06Q 50/06* (2012.01)
(Continued)

(52) U.S. Cl.
CPC ............. *G06Q 50/06* (2013.01); *G06F 17/18* (2013.01); *G06N 5/04* (2013.01); *G06Q 10/0635* (2013.01); *G06Q 10/20* (2013.01)

(58) Field of Classification Search
CPC .... G06Q 50/06; G06Q 10/0635; G06Q 10/20; G06Q 10/04; G06Q 10/00; G06F 17/18;
(Continued)

(56) References Cited

U.S. PATENT DOCUMENTS 7,020,802 B2    3/2006   Gross et al.
7,281,112 B1    10/2007  Gross et al.
(Continued)

FOREIGN PATENT DOCUMENTS

CN    102072829 A  *  5/2011
CN    108344564 A  *  7/2018    ........... G06K 9/0051
(Continued)

OTHER PUBLICATIONS

U.S. Pat. No. 9,933,338 B2, see the compressed version, Apr. 2018.*
(Continued)

*Primary Examiner* — Kandasamy Thangavelu
(74) *Attorney, Agent, or Firm* — Kraguljac Law Group, LLC

(57) ABSTRACT

During operation, the system receives time-series signals gathered from sensors in a utility system asset. Next, the system uses an inferential model to generate estimated values for the time-series signals, and performs a pairwise differencing operation between actual values and the estimated values for the time-series signals to produce residuals. The system then performs a sequential probability ratio test (SPRT) on the residuals to produce SPRT alarms. Next, the system applies an irrelevance filter to the SPRT alarms to produce filtered SPRT alarms, wherein the irrelevance filter removes SPRT alarms for signals that are uncorrelated with previous failures of similar utility system assets. The system then uses a logistic-regression model to compute an RUL-based risk index for the utility system asset based on the filtered SPRT alarms. When the risk index exceeds a threshold, the system generates a notification indicating that the utility system asset needs to be replaced.

20 Claims, 4 Drawing Sheets

(51) Int. Cl.
*G06F 17/18* (2006.01)
*G06N 5/04* (2006.01)
*G06Q 10/06* (2012.01)
*G06Q 10/00* (2012.01)

(58) Field of Classification Search
CPC ...... G06N 5/04; F03D 17/00; G01R 31/2884; G01R 3/10; G05B 23/024; G06K 9/0051; G07C 5/006; G08B 29/06; G08B 29/04; H02J 3/24; H02J 13/004
See application file for complete search history.

(56) References Cited

U.S. PATENT DOCUMENTS

| | | | |
|---|---|---|---|
| 7,613,576 | B2 | 11/2009 | Gross et al. |
| 7,613,580 | B2 | 11/2009 | Gross et al. |
| 7,702,485 | B2 | 4/2010 | Gross et al. |
| 7,869,977 | B2 | 1/2011 | Lewis et al. |
| 8,055,594 | B2 | 11/2011 | Dhanekula et al. |
| 8,069,490 | B2 | 11/2011 | Gross et al. |
| 8,275,738 | B2 | 9/2012 | Gross et al. |
| 8,341,759 | B2 | 12/2012 | Gross et al. |
| 8,457,913 | B2 * | 6/2013 | Zwinger ............ G01R 31/2884 702/77 |
| 8,543,346 | B2 | 9/2013 | Gross et al. |
| 9,933,338 | B2 * | 4/2018 | Noda .................. G05B 23/024 |
| 10,452,510 | B2 | 10/2019 | Gross et al. |
| 10,496,084 | B2 | 12/2019 | Li et al. |
| 2008/0140362 | A1 | 6/2008 | Gross et al. |
| 2008/0252309 | A1 | 10/2008 | Gross et al. |
| 2008/0252441 | A1 * | 10/2008 | McElfresh ............. G08B 29/06 340/507 |
| 2008/0256398 | A1 | 10/2008 | Gross et al. |
| 2009/0099830 | A1 | 4/2009 | Gross et al. |
| 2009/0125467 | A1 | 5/2009 | Dhanekula et al. |
| 2009/0306920 | A1 | 12/2009 | Zwinger et al. |
| 2010/0023282 | A1 | 1/2010 | Lewis et al. |
| 2010/0033386 | A1 | 2/2010 | Lewis et al. |
| 2010/0161525 | A1 * | 6/2010 | Gross .................... G01R 33/10 706/12 |
| 2010/0305892 | A1 | 12/2010 | Gross et al. |
| 2010/0306165 | A1 | 12/2010 | Gross et al. |
| 2012/0030775 | A1 | 2/2012 | Gross et al. |
| 2014/0354300 | A1 | 12/2014 | Ramachandran et al. |
| 2017/0163669 | A1 * | 6/2017 | Brown ..................... G06N 5/04 |
| 2018/0011130 | A1 | 1/2018 | Aguayo Gonzalez et al. |
| 2018/0276044 | A1 | 9/2018 | Fong et al. |
| 2018/0349797 | A1 | 12/2018 | Garvey et al. |
| 2019/0188584 | A1 * | 6/2019 | Rao ........................ G06Q 10/00 |
| 2019/0196892 | A1 | 6/2019 | Matei et al. |
| 2019/0197145 | A1 | 6/2019 | Gross et al. |
| 2019/0237997 | A1 * | 8/2019 | Tsujii ........................ H02J 3/24 |
| 2019/0243799 | A1 | 8/2019 | Gross et al. |
| 2019/0286725 | A1 | 9/2019 | Gawlick et al. |
| 2019/0324430 | A1 * | 10/2019 | Herzog .................. G07C 5/006 |
| 2019/0378022 | A1 | 12/2019 | Wang et al. |
| 2020/0201950 | A1 * | 6/2020 | Wang ....................... F03D 17/00 |
| 2020/0387753 | A1 | 12/2020 | Brill et al. |
| 2021/0158202 | A1 | 5/2021 | Backlawski et al. |
| 2021/0174248 | A1 | 6/2021 | Wetherbee et al. |

FOREIGN PATENT DOCUMENTS

| | | | | | |
|---|---|---|---|---|---|
| JP | 2017021282 | A | * | 1/2017 | |
| JP | 2018195945 | A | * | 12/2018 | |
| KR | 19990077643 | A | * | 10/1999 | .......... H02J 13/0004 |
| KR | 20170096133 | A | * | 8/2017 | ............. G08B 29/04 |

OTHER PUBLICATIONS

U.S. Pat. No. 8,457,913 B2, see the compressed version, Jun. 2013.*
Liao et al., "Predicting remaining useful life of an individual unit using proportional hazzards model and logistics regression model", IEEE 2006.*
US 2020/0201950 A1, see the compressed version, Jun. 2020.*
US 20080252441 A1, See compressed version, Oct. 2008.*
US 20170163669 A1, See compressed version, Jun. 2017.*
US 20190237997 A1, see compressed version, Aug. 2019.*
US 20190188584 A1, see compressed version, Jun. 2019.*
US 20100161525 A1, see compressed version, Jun. 2010.*
US 20190324430 A1, see compressed version, Oct. 2019.*
Martin et al., "Inferential models", Indiana University, Feb. 2011.*
Wald, A, "Sequential Probability Ratio Test for Reliability Demonstration", John Wiley & Sons, 1947.*
U.S. Nuclear Regulatory Commission: "Technical Review of On-Lin Monitoring Techniques for Performance Assessment vol. 1: State-of-the Art", XP055744715, Jan. 31, 2006, pp. 1-132.
Search Report and Written Opinion of the European Patent Office for PCT Patent Application No. PCTUS2020/039630 dated Nov. 10, 2020.
Whisnant et al; "Proactive Fault Monitoring in Enterprise Servers", 2005 IEEE International Multiconference in Computer Science & Computer Engineering, Las Vegas, NV, Jun. 27-30, 2005.
Garcia-Martin Eva et al., "Estimation of Energy Consumption in Machine Learning," Journal of Parallel and Distributed Computing, Elsevier, Amsterdam, NL, vol. 134, Aug. 21, 2019 (Aug. 21, 2019), pp. 77-88.
Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.
Dickey et al.; Checking for Autocorrelation in Regression Residuals; pp. 959-965; Proceedings of 11th Annual SAS Users Group International Conference; 1986.
Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/Sugi93/Sugi-93-193%20Hoyer%20Gross.pdf.
Gou, Yuhua, "Implementation of 3d Kiviat Diagrams." (2008). (Year: 2008).
Wang, Ray C., et al., Process Fault Detection Using Time-Explicit Kiviat Diagrams. AIChE Journal 61.12 (2015): 4277-4293.
Kenny Gross, Oracle Labs; MSET2 Overview: "Anomaly Detection and Prediction" Oracle Cloud Autonomous Prognostics; p. 1-58; Aug. 8, 2019.
Gribok, et al,. "Use of Kernel Based Techniques for Sensor Validation in Nuclear Power Plants," International Topica Meeting on Nuclear Plant Instrumentation, Controls, and Human-Machine Interface Technologies (NPIC & HMIT 2000), Washington, DC, Nov. 2000, pp. 1-15.
Gross, K. C. et al., "Application of a Model-Based Fault Detection System to Nuclear Plant Signals," downloaded from https://www.researchgate.net/publication/236463759; Conference Paper: May 1, 1997, 5 pages.
Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.

* cited by examiner

USING AN IRRELEVANCE FILTER TO FACILITATE EFFICIENT RUL ANALYSES FOR UTILITY SYSTEM ASSETS

RELATED APPLICATIONS

This application is related to U.S. patent application Ser. No. 16/295,613, entitled "Estimating the Remaining Useful Life of a Power Transformer Based on Real-Time Sensor Data and Periodic Dissolved Gas Analysis" by inventors Kenny C. Gross, et al., filed on 7 Mar. 2019. U.S. patent application Ser. No. 16/295,613 claims the benefit of U.S. Provisional Patent Application No. 62/648,121, entitled "Per Transformer Real Time Prognostics and Boot Strapped Remaining Useful Life Estimation" by inventors Kenny C. Gross, et al., filed on 26 Mar. 2018. The above-referenced applications are hereby incorporated herein by reference.

BACKGROUND

Field

The disclosed embodiments generally relate to techniques for improving the reliability of electrical utility systems. More specifically, the disclosed embodiments relate to a technique that uses an irrelevance filter to facilitate efficient remaining useful life (RUL) analyses to improve the reliability of utility system assets in the field.

Related Art

Utility system assets, such as power transformers, are critical for ensuring the uninterrupted delivery of electrical power from power generation facilities to consumers in electrical distribution grids. Electrical grids are typically "fault tolerant" with respect to losing generation assets, because whenever a power plant fails, replacement power can usually be pulled through the distribution grid to meet consumer demand. In contrast, power transformer failures typically lead to "blackouts," which may affect consumers in small areas comprising a few blocks, or may possibly affect consumers throughout a large service region comprising multiple square miles. Also, the failure of a single transformer can potentially cause a very large voltage spike to be propagated throughout the distribution grid, which can cause other transformers to fail, and can lead to a large-scale, regional blackout affecting hundreds of square miles. Transformer explosions can also cause fires, which can result in significant property damage and loss of life. Hence, it is desirable to be able to monitor the operational health of power transformers, if possible, to identify degraded transformers before they fail.

The present state of the art for power transformer monitoring is dissolved gas analysis (DGA). DGA operates by detecting the presence of dissolved hydrocarbon gasses in oils, which are used to bathe the transformer windings. When components inside a transformer become hot enough to generate hydrocarbon gasses, this indicates a heat-related problem in the transformer. The problem with DGA is that it requires oil samples to be periodically extracted from transformers and chemical analyses to detect the presence of the hydrocarbon gasses. This process is both time-consuming and expensive, which means that DGAs are performed infrequently, for example once a year. Moreover, a DGA is essentially "reactive" and not "prognostic" because it detects the downstream symptoms of problems, well after the problems developed that caused hotspots that were sufficient to "bake out" the hydrocarbon gasses.

Some researchers have investigated the possibility of determining a remaining useful life (RUL) for a power transformer using prognostic-surveillance techniques that analyze time-series sensor signals produced by power transformers. (For example, see U.S. patent application Ser. No. 16/295,613, entitled "Estimating the Remaining Useful Life of a Power Transformer based on Real-Time Sensor Data and Periodic Dissolved Gas Analyses," by inventors Kenny C. Gross, et al., filed on 7 Mar. 2019, which is hereby incorporated herein by reference.) However, one challenge that needs to be addressed for these prognostic-surveillance techniques is that utility system assets tend to fail infrequently. This means there may not exist sufficient historical failure data to determine whether an anomalous pattern of sensor signals is indicative of an impending failure, or is simply a new pattern of sensor signals, which is not correlated with an impending failure. This lack of historical failure data means that prognostic-surveillance techniques are likely to generate a high rate of false alarms, which leads to unnecessary maintenance operations, and may cause utility system assets to be prematurely replaced.

Hence, what is needed is a technique for assessing the operational health and remaining useful life of utility system assets without the above-described shortcomings of existing techniques.

SUMMARY

The disclosed embodiments provide a system that estimates a remaining useful life (RUL) of a utility system asset. During a surveillance mode, the system iteratively performs the following operations. First, the system receives a set of present time-series signals gathered from sensors in the utility system asset. Next, the system uses an inferential model to generate estimated values for the set of present time-series signals, and performs a pairwise differencing operation between actual values and the estimated values for the set of present time-series signals to produce residuals. The system then performs a sequential probability ratio test (SPRT) on the residuals to produce SPRT alarms. Next, the system applies an irrelevance filter to the SPRT alarms to produce filtered SPRT alarms, wherein the irrelevance filter removes SPRT alarms for signals that are not correlated with previous failures of similar utility system assets. The system then uses a logistic-regression model to compute an RUL-based risk index for the utility system asset based on the filtered SPRT alarms. Finally, when the risk index exceeds a risk-index threshold, the system generates a notification indicating that the utility system asset needs to be replaced.

In some embodiments, the system periodically updates the logistic-regression model and the irrelevance filter based on time-series signals from additional utility system assets that have failed.

In some embodiments, to reduce computational workload, the RUL-based index is computed for a utility system asset only when more than a threshold number of filtered SPRT alarms were generated during a preceding time interval.

In some embodiments, during an inferential-training mode, which precedes the surveillance mode, the system receives an inferential training set of time-series signals gathered from sensors in the utility system asset during normal fault-free operation. Next, the system trains the inferential model to predict values of the time-series signals based on the inferential training set.

In some embodiments, during an RUL-training mode, which precedes the surveillance mode, the system receives an RUL training set comprising time-series signals gathered from sensors in similar utility system assets while the similar utility system assets are run to failure. The system also receives associated failure times for the similar utility system assets. Next, the system uses the inferential model to generate estimated values for the RUL training set of time-series signals. The system then performs a pairwise differencing operation between actual values and the estimated values for the RUL training set of time-series signals to produce residuals. Next, the system performs a SPRT on the residuals to produce SPRT alarms with associated tripping frequencies. Finally, the system trains the logistic-regression model to predict an RUL for the utility system asset based on correlations between the SPRT alarm tripping frequencies and the failure times for the similar utility system assets.

In some embodiments, during the RUL-training mode, the system also configures the irrelevance filter. During this process, the system identifies relevant SPRT alarms that were generated during a time interval before a utility system asset failed, and then configures the irrelevance filter to remove SPRT alarms that are not relevant.

In some embodiments, while training the logistic-regression model to predict the RUL for the utility system asset, the system only considers SPRT alarm tripping frequencies associated with relevant SPRT alarms.

In some embodiments, the time-series signals gathered from sensors in the utility system asset include signals specifying one or more of the following: temperatures; currents; voltages; resistances; capacitances; vibrations; dissolved gas metrics; cooling system parameters; and control signals.

In some embodiments, the inferential model comprises a Multivariate State Estimation Technique (MSET) model.

In some embodiments, the utility system asset comprises a power transformer.

DETAILED DESCRIPTION

Figure 1:
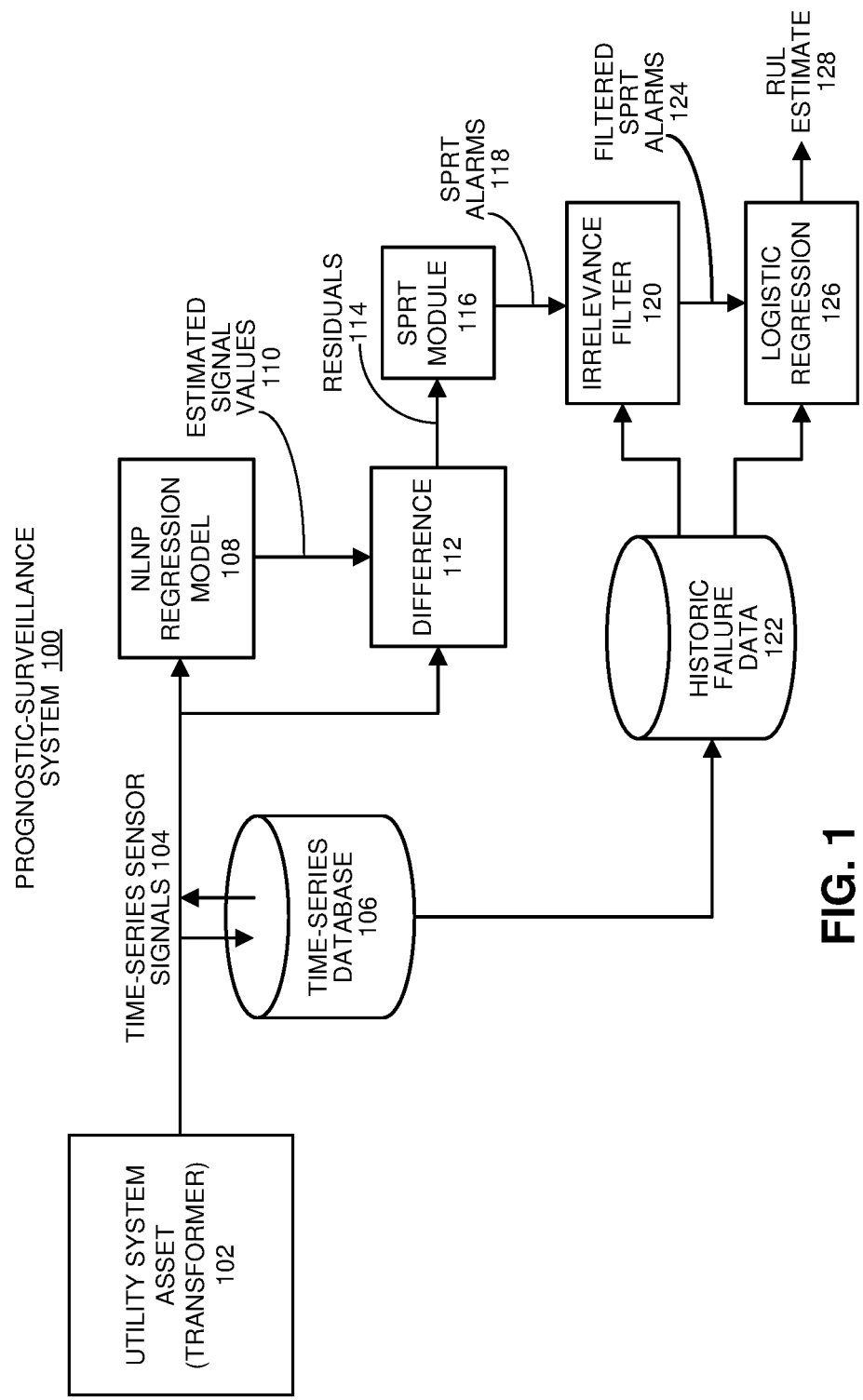
FIG. 1 illustrates an exemplary prognostic-surveillance system for a utility system asset in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments make use of a novel "irrelevance filter," which mimics the functionality of the human brain's basal ganglia to facilitate improved RUL prognostics for large populations of high-cost utility grid assets, especially high-voltage transformers. Many industries are presently benefitting from a new science called "biomimicry" that analyzes nature's best ideas and adapts them for engineering use cases. The invention disclosed herein provides an example of biomimicry.

Swedish researchers performing MRI studies on human brains discovered that the basal ganglia act as an "irrelevance filter," which plays a crucial role in human memory and cognition. If the human brain tried to process and store all inputs coming in through the senses, the brain would be overwhelmed. The basal ganglia weeds out unnecessary information, thereby leaving only those details essential to form memories that contribute to survival of a species, such as memories associated with: acquisition of food; avoidance of danger; propagation of the species; and assurance that basic needs are met. It has been shown that humans with the best memories have highly active basal ganglia.

This basal ganglia paradigm can be useful for facilitating certain types of engineering-related tasks. For example, researchers are beginning to explore the possibility of using machine learning (ML), which is based on surveillance of time-series signals obtained from sensors in utility system assets, to facilitate the scheduling of maintenance operations. It has been demonstrated that ML pattern-recognition techniques can be trained using sensor signals generated when an asset is deemed to be operating without faults, and can then be used to detect anomalous signal patterns for that asset, which can be used to schedule predictive maintenance to remediate the underlying causes of the anomalous signal patterns.

Note that it is extremely valuable for the asset operator to receive an alarm comprising an early warning about a potential problem. This makes it possible to take the asset out of service as soon as possible to quickly diagnose the root cause of the anomalous signals. However, when there exists a large population of similar assets, what is more valuable is RUL estimation, which provides an estimate of how long that asset will be able to operate safely before the probability of catastrophic failure reaches a critical threshold (e.g. 95% probability of failure). For example, two transformers in a utility grid may both issue early warning alerts. However, if the service organization knows that a first transformer has an RUL estimate of 2 months, but a second transformer is likely to fail in the next 72 hours, it is more beneficial to schedule emergency remediation operations on the second transformer, and to wait for a "convenient maintenance window" to remediate the first transformer.

However, for high-cost and high-reliability utility assets, which fail infrequently, existing RUL-estimation techniques may not work well because only a handful of assets have actually failed in service. This means there may not exist sufficient training data for an ML technique to be able to detect anomalous signal patterns that are correlated with asset failures. For example, a given asset may produce anomalous time-series signal patterns that have never been seen before on that asset, and which would consequently generate an alarm. However, such anomalous patterns might be deemed "irrelevant" if the same patterns were previously observed in other healthy assets that have operated without incident for years. This means that many prognostic-surveillance alarms will wind up being false alarms. For example, an anomalous (but harmless) pattern of time-series signals may be associated with: a relatively new asset; an asset operating in an environment with large temperature fluctuations; or an asset operating in an environment with large fluctuations in electrical flow (e.g., from population changes or utility grid reconfigurations). Such alarms may be caused by new patterns in time-series data for individual assets, but may have no prognostic-health significance.

Hence, what is needed is an "irrelevance filter" that processes time-series signals for utility system assets that have been run to failure, and produces optimal weighting factors for an associated RUL methodology. Note that this is analogous to the functionality of a basal ganglia "filter" for a human brain, which receives large streams of neural "signals" associated with the five primary senses, and periodically "alerts" the human to patterns that have direct relevance to danger, subsistence, or propagation-of-species opportunities.

Our new ML-based technique operates by processing data historian files. More specifically, when a population of utility system assets, such as high-voltage transformers, is monitored, the time-series telemetry signals are continuously stored in data historian files, wherein there exists one (logical) data historian file for each monitored asset. These data historian files can be "harvested" continuously (e.g., in 1 to 15 minute increments) and added to a large database, where they are processed to discover trends, anomalies, environmental problems, and other incipient problems.

Our anomaly discovery process uses a systematic binary hypothesis technique called the "sequential probability ratio test" (SPRT) as an irrelevance filter for large volumes of time-series signals, and identifies small subsets of time-series signals that warrant further pattern-recognition analyses to facilitate anomaly detection. Hence, our new technique substantially reduces RUL-analysis costs by systematically and safely filtering anomaly alerts generated for individual utility system assets so that RUL-analysis operations are only performed for "relevant" signature patterns that are likely to be associated with incipient fault conditions.

Before we describe the operation of our new RUL-estimation technique further, we first describe an exemplary prognostic-surveillance system in which the new technique operates.

Prognostic-Surveillance System

FIG. 1 illustrates an exemplary prognostic-surveillance system 100 in accordance with the disclosed embodiments. As illustrated in FIG. 1, prognostic-surveillance system 100 operates on a set of time-series sensor signals 104 obtained from sensors in a utility system asset 102, such as a power transformer. Note that time-series signals 104 can originate from any type of sensor, which can be located in a component in utility system asset 102, including: a voltage sensor; a current sensor; a pressure sensor; a rotational speed sensor; and a vibration sensor. We denote these time-series sensor signals as $X=[X_1, \ldots, X_m]$, where $X(t)=[X_1(t), \ldots, X_m(t)]$ is the value of the time-series sensor signals at time t.

During operation of prognostic-surveillance system 100, time-series signals 104 feed into a time-series database 106, which stores the time-series signals 104 for subsequent analysis. Next, the time-series signals 104 either feed directly from utility system asset 102 or from time-series database 106 into a non-linear, non-parametric (NLNP) regression model 108. Upon receiving the time-series sensor signals 104, NLNP regression model 108 performs a non-linear, non-parametric regression analysis on the samples (including a "current sample"). When the analysis is complete, NLNP regression model 108 outputs estimated signal values 110.

In one embodiment of the present invention, NLNP regression model 108 uses a multivariate state estimation technique ("MSET") to perform the regression analysis. Note that the term MSET as used in this specification refers to a technique that loosely represents a class of pattern recognition techniques. (For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000.) Hence, the term "MSET" as used in this specification can refer to any technique outlined in [Gribok], including Ordinary Least Squares (OLS), Support Vector Machines (SVM), Artificial Neural Networks (ANNs), MSET, or Regularized MSET (RMSET). Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Before MSET is used to monitor a system, a model is constructed from which estimates of the system's correct operational state are made. The model is derived empirically from observations made during a training phase on the real system under expected normal operating conditions. Relationships among the signals are learned during the training phase, and these relationships then are used in the surveillance phase of the algorithm to compute estimates of the system state.

An observation of the system state is represented by a vector V of length n, where n is the number of signals in the system. Although the state vector elements do not need to be linearly independent, there must be some degree of correlation (though not necessarily linear) among the element values.

State vectors collected during the training phase are arranged in a state matrix with m column vectors, each column vector being a state vector of length n that stores the values of all signals at a particular point in time during the training phase. The quality of the estimates produced during the MSET surveillance phase depends on how well the subset of m state vectors represents the expected behavior of the system as observed during the training phase.

More formally, a state vector $X(t_j)$ is defined as:

$$X(t_j)=[x_1(t_j),x_2(t_j),\ldots,x_n(t_j)]^T,$$

where $x_i(t_j)$ is the measurement from signal i at time $t_j$. Then the state matrix D can be defined as $$D=[X(t_1),X(t_2),\ldots,X(t_m)].$$

When MSET is monitoring a system for degradation in its surveillance phase, the state matrix D acts as a fixed model of the system from which signal values are estimated. Suppose for the time being that the signal measurements represent linearly correlated phenomena. Then one can express a state vector as a linear combination of the column vectors stored in the state matrix D, assuming that D sufficiently spans the operational space of the system. Minimizing the Euclidean norm between the estimated state vector $X_{est}$ and actual state vector $X_{obs}$ gives the following linearly optimal estimate of $X(t_i)$:

$$X_{est}=D(D^TD)^{-1}D^TX_{obs}. \quad (\text{Eq. 1})$$

Real systems, however, are rarely linear. It is desired to extend the formalism of the linear approach in Eq. 1 (most importantly, the concept of expressing an estimated state vector as a function of both the current state vector and a history of learned state vectors) to nonlinear systems. Adhering to the general formalism in Eq. 1 is also attractive from the standpoint that the model can be extended by adding new state vectors to D. With these benefits in mind, one can maintain the form of the linear estimation equation while replacing some of the linear matrix operators with a nonlinear matrix operator $\otimes$:

$$X_{est}=D(D^T \otimes D)^{-1}D^T \otimes X_{obs}. \quad (\text{Eq. 2})$$

The value of $X_{est}$ given by Eq. 2 is called the MSET estimate for observation $X_{obs}$. The nonlinear operator $\otimes$ must preserve the following properties:

1. The matrix $D^T \otimes D$ must be nonsingular.
2. The estimation vector $X_{est}$ must represent an optimum estimation even if some elements of $X_{obs}$ fall outside the range of the same elements in D (i.e., when an observed signal value is less than the minimum or greater than the maximum value of the signal observed during the training phase).
3. If the observation vector $X_{obs}$ is identical to one of the column vectors in D, then the estimation vector $X_{est}$ must be identical to $X_{obs}$.
4. The difference between $X_{obs}$ and $X_{est}$ must be minimized.

Nonlinear operators that fulfill these conditions exist and have been shown to be successful in monitoring real systems.

Returning back to FIG. 1, NLNP regression model 108 is "trained" to learn patterns of correlation among the time-series signals 104. This training process involves a one-time, computationally intensive computation, which is performed offline with accumulated data that contains no anomalies.

The pattern-recognition system is then placed into a "real-time surveillance mode," wherein the trained NLNP regression model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114, which are passed into SPRT module 116. For the embodiment of the present invention that uses MSET regression analysis, the residual can be calculated using the following expression:

$$R(t)=X(t)-MSET(X(t)).$$

SPRT module 116 then performs a "detection operation" on the residuals 114 to detect anomalies and possibly to generate SPRT alarms 118. SPRT module uses the sequential probability ratio test (SPRT) proposed by Wald to detect subtle statistical changes in a stationary noisy sequence of observations at the earliest possible time. (See Wald, Abraham, June 1945, "Sequential Tests of Statistical Hypotheses," *Annals of Mathematical Statistics*, 16 (2): 117-186.) For purposes of exposing the details of the SPRT, assume that the monitored process signal Y is normally distributed with mean zero and standard deviation $\sigma$ (processes with nonzero mean p can be transformed into a zero-meaned process by subtracting from each observation). Process signal Y is said to be degraded if the observations made on Y appear to be distributed about mean M with normal (Gaussian) distribution instead of mean zero, where M is a predetermined system disturbance magnitude.

The SPRT provides a quantitative framework for deciding between two hypotheses related to this concept of signal degradation: (1) $H_0$: observations of Y are drawn from a normal distribution with mean zero and standard deviation $\sigma$; and (2) $H_1$: observations of Y are drawn from a normal distribution with mean M and standard deviation $\sigma$.

We will suppose that if $H_0$ or $H_1$ is true, then we wish to decide for $H_0$ or $H_1$ with probabilities $(1-\alpha)$ or $(1-\beta)$, respectively, where $\alpha$ and $\beta$ represent the error misidentification probabilities (hence, it follows that $0 \le \alpha, \beta \le 1$). Stated another way, $\alpha$ is the false alarm probability, which is the probability of accepting $H_1$ when $H_0$ is true, and $\beta$ is the missed alarm probability, which is the probability of accepting $H_0$ when $H_1$ is true.

The likelihood ratio $L_n$ can be calculated after n observations $y_1, y_2, \ldots, y_n$ of Y as $$L_n = \frac{Pr(y_1,y_2,\ldots,y_n|H_1)}{Pr(y_1,y_2,\ldots,y_n|H_0)}$$

where $Pr(y_1, y_2, \ldots, y_n|H_i)$ is the probability of observing sequence $y_1, y_2, \ldots, y_n$ given that Hi is true. Taking the natural log of the likelihood ratio and assuming independent observations produces $$L_n = \sum_{i=1}^{n} \frac{Pr(y_i|H_1)}{Pr(y_i|H_0)}. \quad (\text{Eq. 3})$$

Wald's theory states that sampling Y continues as long as $A<L_n<B$, where A and B are acceptance thresholds related to the error misidentification probabilities $\alpha$ and $\beta$, $$A = \frac{\beta}{1-\alpha} \quad B = \frac{1-\beta}{\alpha}.$$

We stop sampling Y and decide $H_1$ as soon as $L_n > B$, and we stop sampling and decide $H_0$ as soon as $L_n < A$. Note that to monitor the system continuously, the SPRT algorithm resets itself as soon as a decision has been made. For example, if the likelihood ratio crosses the A threshold, signifying that the process signal is not degraded at that time, then the next sample is treated as the first sample (n=1 according to Eq. 3) in a new sequence of observations.

Assuming that the observations $y_1, y_2, \ldots, y_n$ of Y are normally distributed yields a particularly compact expression for Eq. 3:

$$L_n = \frac{M}{\sigma^2} \sum_{i=1}^{n} y_i \frac{M}{2}. \qquad \text{(Eq. 4)}$$

Following Wald's sequential analysis, it has been shown that a decision test based on the SPRT has an optimal property; that is, for given probabilities $\alpha$ and $\beta$ there is no other procedure with at least as low error probabilities or expected risk and with shorter length average sampling time than the SPRT. It is because of this property and the inherent simplicity of equation (2) that the SPRT is popular for monitoring stationary Gaussian random processes.

Note that the SPRT presented above is a parametric test, meaning that the probability density function and associated parameters must be known prior to applying the SPRT. Eq. 4 is derived for normally distributed observations of process signal Y; one can derive expressions for other distributions (e.g., exponential, Poisson, binomial) as well. In practical computing systems, however, it may be difficult to assume that:

1. The distribution of a process signal is known in advance.
2. The distribution of the process signal does not change over time.
3. The parameters of the distribution do not change over time.

Nonparametric sequential detection tests do exist, but the mathematics behind them are considerably more complex than presented above for the parametric SPRT. Even if the a priori distribution is known, the third assumption is often violated in practical computing systems. A nominally stationary Gaussian random process may enter a new operating regime (characterized by a different mean value or different higher moments) upon influence from stimuli. In executing computing systems, for example, a sudden workload change may cause a monitored voltage or current signal to have an upward or downward step change in its nominal value. The SPRT recognizes such a step change as a degraded signal, since the observations no longer appear to be drawn from a distribution conforming to the original $H_0$ hypothesis.

Referring to FIG. 1, NLNP regression model 108 and difference module 112 work together to remove (filter) the dynamics in the signals X(t) so that the residual R(t) is a stationary random process when the system is in good condition. As the system ages or degrades due to a failure mechanism, the statistical properties of the residual change. This change is detected by SPRT module 116, which generates corresponding SPRT alarms 118.

During operation, SPRT module 116 applies a sequential probability ratio test to the residuals and produces an alarm when one or several residuals become statistically different from the residual corresponding to the undegraded condition of the system.

The SPRT alarms 118 then feed through an irrelevance filter 120, which removes SPRT alarms for signals that are not correlated with previous failures of similar utility system assets to produce filtered SPRT alarms 124. Filtered SPRT alarms 124 feed into a logistic-regression model 126, which generates an RUL estimate 128, wherein the RUL estimate 128 can be expressed as a "quantitative risk index" as is described in more detail below.

While calculating RUL estimate 128, logistic-regression model 126 records each instance an alarm in filtered SPRT alarms 124, and uses these instances to determine the current alarm-tripping frequency. As degradation progresses, the tripping frequency of the filtered alarms increases. We denote these alarm-tripping frequencies as $F = [F_1, \ldots F_m]$, where $F(t) = [F_1(t), \ldots F_m(t)]$ is the value of the prognostic parameters at time t. Hence, at time t:

$$F(t) = \text{SPRT}(R(t)).$$

Logistic-regression model 126 then calculates the RUL of utility system asset 102 in the following way. We denote the probability of system S to fail within next T hours given the current condition determined by the current SPRT alarm-tripping frequencies F as p(T,F). The relationship between the p and the current condition F is modeled using the linear logistic regression model:

$$p(T,X) = 1/(1 + \exp(-(a(T) + b_1(T)*F_1 + b_2(T)*F_2 + \ldots + b_m(T)*F_m))).$$

where a(T) and $b(T) = [b_1(T), \ldots, b_m(T)]$ are estimated from historical or experimental failure data for the system. Note that the tripping frequencies are normalized to have values between 0 and 1 to simplify this calculation.

RUL-Estimation Technique

Figure 2:
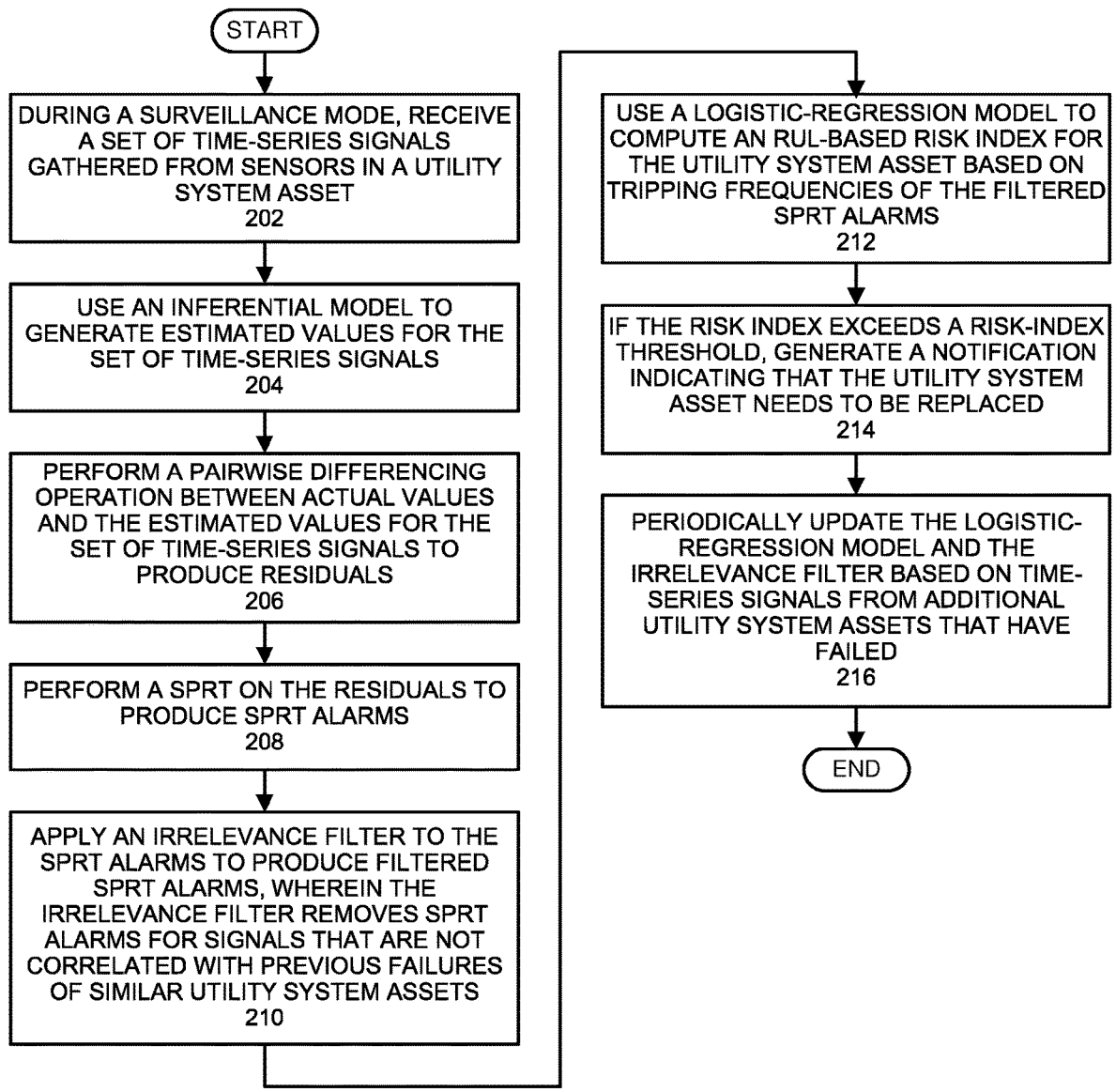
FIG. 2 presents a flow chart for a process that estimates an RUL for a utility system asset in accordance with the disclosed embodiments.

FIG. 2 presents a flow chart for a process that estimates an RUL for a utility system asset in accordance with the disclosed embodiments. During a surveillance mode, the system iteratively performs the following operations. First, the system receives a set of present time-series signals gathered from sensors in the utility system asset (step 202). Next, the system uses an inferential model to generate estimated values for the set of present time-series signals (step 204), and then performs a pairwise differencing operation between actual values and the estimated values for the set of present time-series signals to produce residuals (step 206). The system then performs a sequential probability ratio test (SPRT) on the residuals to produce SPRT alarms (step 208). Next, the system applies an irrelevance filter to the SPRT alarms to produce filtered SPRT alarms, wherein the irrelevance filter removes SPRT alarms for signals that are not correlated with previous failures of similar utility system assets (step 210). The system then uses a logistic-regression model to compute an RUL-based risk index for the utility system asset based on tripping frequencies of the filtered SPRT alarms (step 212). If the risk index exceeds a risk-index threshold, the system generates a notification indicating that the utility system asset needs to be replaced (step 214). Finally, the system periodically updates the logistic-regression model and the irrelevance filter based on time-series signals from additional utility system assets that have failed (step 216).

Figure 3:
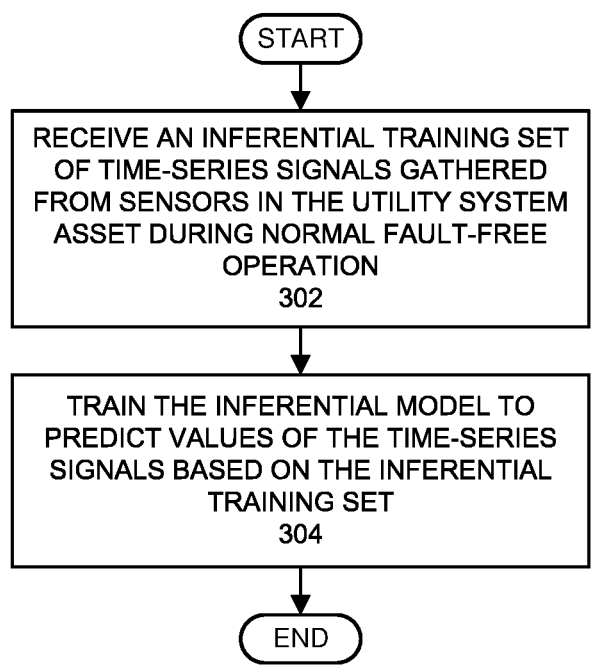
FIG. 3 presents a flow chart illustrating a process for training an inferential model for a utility system asset in accordance with the disclosed embodiments.

FIG. 3 presents a flow chart illustrating a process for training an inferential model in accordance with the disclosed embodiments. During an inferential-training mode, which precedes the surveillance mode, the system receives an inferential training set of time-series signals gathered from sensors in the utility system asset during normal fault-free operation (step 302). The system then trains the inferential model to predict values of the time-series signals based on the inferential training set (step 304).

Figure 4:
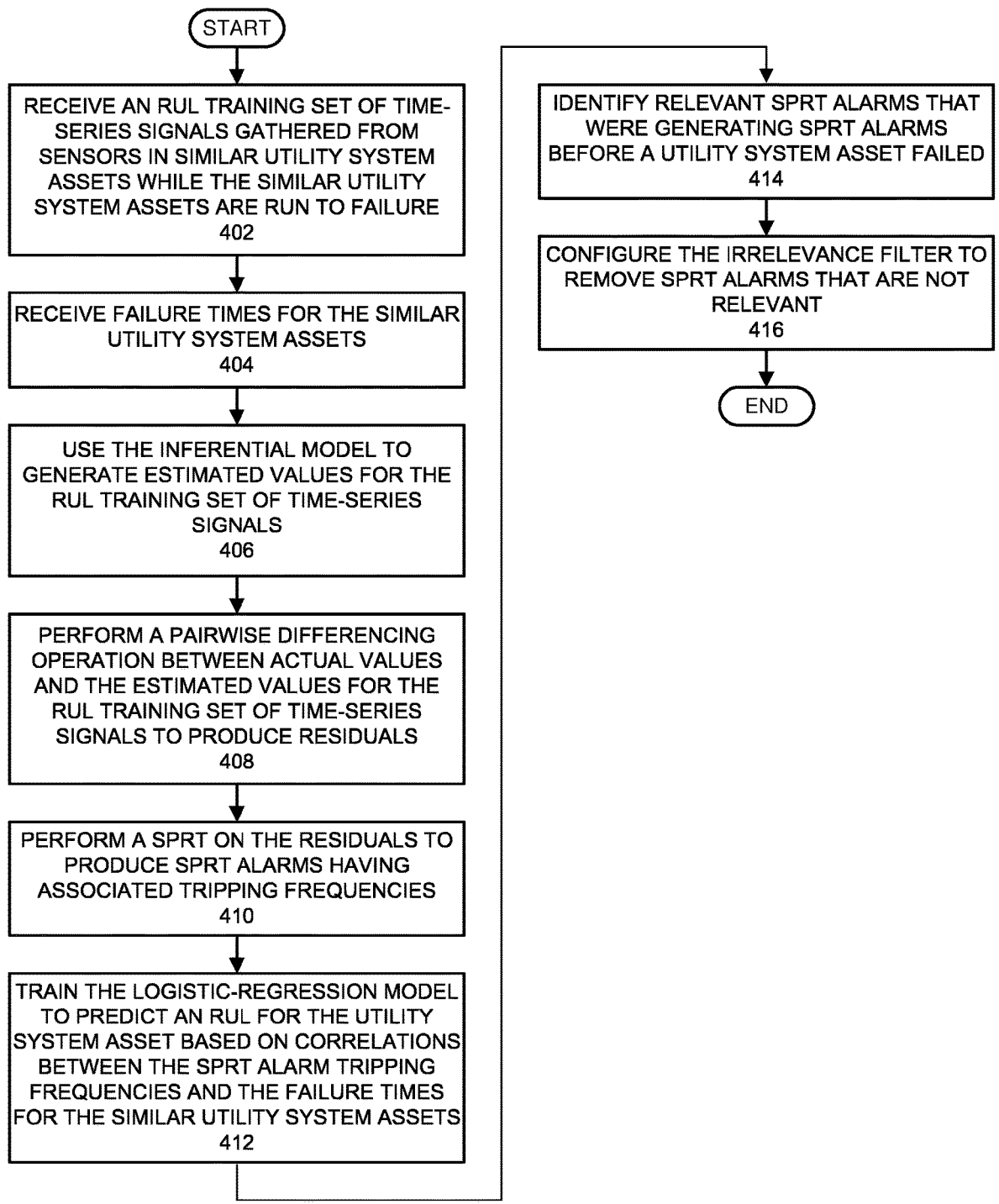
FIG. 4 presents a flow chart illustrating a process for training a logistic-regression model to predict an RUL for a utility system asset and for configuring an associated irrelevance filter in accordance with the disclosed embodiments.

FIG. 4 presents a flow chart illustrating a process for training a logistic-regression model to predict an RUL for an asset and for configuring an associated irrelevance filter in accordance with the disclosed embodiments. During an RUL-training mode, which precedes the surveillance mode, the system receives an RUL training set comprising time-series signals gathered from sensors in similar utility system assets while the similar utility system assets are run to failure (step 402). The system also receives associated failure times for the similar utility system assets (step 404). (Note that the process for determining which utility system assets are similar can involve automatically clustering the assets to form clusters comprising "like makes/models," either from a list of asset makes/models, or empirically based on the numbers and types of internal sensors. Note that even though the clusters of like makes/models may have different banks of transducers, and different numbers of sensors, what is relevant for purposes of RUL estimation is the general patterns in these time-series signals.)

Next, the system uses the inferential model to generate estimated values for the RUL training set of time-series signals (step 406). The system then performs a pairwise differencing operation between actual values and the estimated values for the RUL training set of time-series signals to produce residuals (step 408). Next, the system performs a SPRT on the residuals to produce SPRT alarms with associated tripping frequencies (step 410). The system then trains the logistic-regression model to predict an RUL for the utility system asset based on correlations between the SPRT alarm tripping frequencies and the failure times for the similar utility system assets (step 412). Next, to configure the irrelevance filter, the system identifies relevant SPRT alarms that were generated during a time interval before a utility system asset failed (step 414), and then configures the irrelevance filter to remove SPRT alarms that are not relevant (step 416).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for estimating a remaining useful life (RUL) of a utility system asset, wherein during a surveillance mode, the method comprises iteratively performing the following operations:
   receiving a set of present time-series signals gathered from sensors in the utility system asset;
   using an inferential model to generate estimated values for the set of present time-series signals;
   performing a pairwise differencing operation between actual values and the estimated values for the set of present time-series signals to produce residuals;
   performing a sequential probability ratio test (SPRT) on the residuals to produce SPRT alarms;
   applying an irrelevance filter to the SPRT alarms to produce filtered SPRT alarms, wherein the irrelevance filter removes SPRT alarms for signals that are not correlated with previous failures of similar utility system assets;
   using a logistic-regression model to compute an RUL-based risk index for the utility system asset based on the filtered SPRT alarms; and
   when the risk index exceeds a risk-index threshold, generating a notification indicating that the utility system asset needs to be replaced.

2. The method of claim 1, wherein the method further comprises periodically updating the logistic-regression model and the irrelevance filter based on time-series signals from additional utility system assets that have failed.

3. The method of claim 1, wherein to reduce computational workload, the RUL-based risk index is computed for a utility system asset only when more than a threshold number of filtered SPRT alarms were generated during a preceding time interval.

4. The method of claim 1, wherein during an inferential-training mode, which precedes the surveillance mode, the method comprises:
   receiving an inferential training set of time-series signals gathered from sensors in the utility system asset during normal fault-free operation; and
   training the inferential model to predict values of the time-series signals based on the inferential training set.

5. The method of claim 1, wherein during an RUL-training mode, which precedes the surveillance mode, the method comprises:
   receiving an RUL training set comprising time-series signals gathered from sensors in similar utility system assets while the similar utility system assets are run to failure;
   receiving associated failure times for the similar utility system assets;
   using the inferential model to generate estimated values for the RUL training set of time-series signals;
   performing a pairwise differencing operation between actual values and the estimated values for the RUL training set of time-series signals to produce residuals;
   performing a SPRT on the residuals to produce SPRT alarms with associated tripping frequencies; and
   training the logistic-regression model to predict an RUL for the utility system asset based on correlations between the SPRT alarm tripping frequencies and the failure times for the similar utility system assets.

6. The method of claim 5, wherein during the RUL-training mode, the method additionally configures the irrelevance filter by:
   identifying relevant SPRT alarms that were generated during a time interval before a utility system asset failed; and
   configuring the irrelevance filter to remove SPRT alarms that are not relevant.

7. The method of claim 6, wherein while training the logistic-regression model to predict the RUL for the utility system asset, the method only considers SPRT alarm tripping frequencies associated with relevant SPRT alarms.

8. The method of claim 1, wherein the time-series signals gathered from sensors in the utility system asset include signals specifying one or more of the following:
- temperatures;
- currents;
- voltages;
- resistances;
- capacitances;
- vibrations;
- dissolved gas metrics;
- cooling system parameters; and
- control signals.

9. The method of claim 1, wherein the inferential model comprises a Multivariate State Estimation Technique (MSET) model.

10. The method of claim 1, wherein the utility system asset comprises a power transformer.

11. A non-transitory, computer-readable storage medium storing instructions that when executed by a computer cause the computer to perform a method for estimating a remaining useful life (RUL) of a utility system asset, wherein during a surveillance mode, the method comprises iteratively performing the following operations:
- receiving a set of present time-series signals gathered from sensors in the utility system asset;
- using an inferential model to generate estimated values for the set of present time-series signals;
- performing a pairwise differencing operation between actual values and the estimated values for the set of present time-series signals to produce residuals;
- performing a sequential probability ratio test (SPRT) on the residuals to produce SPRT alarms;
- applying an irrelevance filter to the SPRT alarms to produce filtered SPRT alarms, wherein the irrelevance filter removes SPRT alarms for signals that are not correlated with previous failures of similar utility system assets;
- using a logistic-regression model to compute an RUL-based risk index for the utility system asset based on the filtered SPRT alarms; and
- when the risk index exceeds a risk-index threshold, generating a notification indicating that the utility system asset needs to be replaced.

12. The non-transitory, computer-readable storage medium of claim 11, wherein the method further comprises periodically updating the logistic-regression model and the irrelevance filter based on time-series signals from additional utility system assets that have failed.

13. The non-transitory, computer-readable storage medium of claim 11, wherein to reduce computational workload, the RUL-based risk index is computed for a utility system asset only when more than a threshold number of filtered SPRT alarms were generated during a preceding time interval.

14. The non-transitory, computer-readable storage medium of claim 11, wherein during an inferential-training mode, which precedes the surveillance mode, the method comprises:
- receiving an inferential training set of time-series signals gathered from sensors in the utility system asset during normal fault-free operation; and
- training the inferential model to predict values of the time-series signals based on the inferential training set.

15. The non-transitory, computer-readable storage medium of claim 11, wherein during an RUL-training mode, which precedes the surveillance mode, the method comprises:
- receiving an RUL training set comprising time-series signals gathered from sensors in similar utility system assets while the similar utility system assets are run to failure;
- receiving associated failure times for the similar utility system assets;
- using the inferential model to generate estimated values for the RUL training set of time-series signals;
- performing a pairwise differencing operation between actual values and the estimated values for the RUL training set of time-series signals to produce residuals;
- performing a SPRT on the residuals to produce SPRT alarms with associated tripping frequencies; and
- training the logistic-regression model to predict an RUL for the utility system asset based on correlations between the SPRT alarm tripping frequencies and the failure times for the similar utility system assets.

16. The non-transitory, computer-readable storage medium of claim 15, wherein during the RUL-training mode, the method additionally configures the irrelevance filter by:
- identifying relevant SPRT alarms that were generated during a time interval before a utility system asset failed; and
- configuring the irrelevance filter to remove SPRT alarms that are not relevant.

17. The non-transitory, computer-readable storage medium of claim 16, wherein while training the logistic-regression model to predict the RUL for the utility system asset, the method only considers SPRT alarm tripping frequencies associated with relevant SPRT alarms.

18. A system that estimates a remaining useful life (RUL) of a utility system asset, comprising:
- at least one processor and at least one associated memory; and
- a notification mechanism that executes on the at least one processor, wherein during a surveillance mode, the notification mechanism iteratively:
  - receives a set of present time-series signals gathered from sensors in the utility system asset;
  - uses an inferential model to generate estimated values for the set of present time-series signals;
  - performs a pairwise differencing operation between actual values and the estimated values for the set of present time-series signals to produce residuals;
  - performs a sequential probability ratio test (SPRT) on the residuals to produce SPRT alarms;
  - applies an irrelevance filter to the SPRT alarms to produce filtered SPRT alarms, wherein the irrelevance filter removes SPRT alarms for signals that are not correlated with previous failures of similar utility system assets;
  - uses a logistic-regression model to compute an RUL-based risk index for the utility system asset based on the filtered SPRT alarms; and
  - when the risk index exceeds a risk-index threshold, generates a notification indicating that the utility system asset needs to be replaced.

19. The system of claim 18, wherein during an RUL-training mode, which precedes the surveillance mode, the notification mechanism:
- receives an RUL training set comprising time-series signals gathered from sensors in similar utility system assets while the similar utility system assets are run to failure;
- receives associated failure times for the similar utility system assets;

using the inferential model to generate estimated values for the RUL training set of time-series signals;

performs a pairwise differencing operation between actual values and the estimated values for the RUL training set of time-series signals to produce residuals;

performs a SPRT on the residuals to produce SPRT alarms with associated tripping frequencies; and trains the logistic-regression model to predict an RUL for the utility system asset based on correlations between the SPRT alarm tripping frequencies and the failure times for the similar utility system assets.

20. The system of claim 19, wherein during the RUL-training mode, the notification mechanism additionally configures the irrelevance filter, wherein during this configuration process the notification mechanism:

identifies relevant SPRT alarms that were generated during a time interval before a utility system asset failed; and configures the irrelevance filter to remove SPRT alarms that are not relevant.

* * * * *

UNITED STATES PATENT AND TRADEMARK OFFICE
CERTIFICATE OF CORRECTION

| | |
|---|---|
| PATENT NO. | : 11,341,588 B2 |
| APPLICATION NO. | : 16/560629 |
| DATED | : May 24, 2022 |
| INVENTOR(S) | : Wetherbee et al. |

It is certified that error appears in the above-identified patent and that said Letters Patent is hereby corrected as shown below:

On the Title Page

On page 2, Column 2, Item (56) under Other Publications, Line 3, delete "hazzards" and insert -- hazards --, therefor.

On page 2, Column 2, Item (56) under Other Publications, Line 46, delete "Topica" and insert -- Topical --, therefor.

In the Specification

In Column 8, Line 26, delete "mean p" and insert -- mean $\mu$ --, therefor.

In Column 8, Line 27, delete "subtracting from" and insert -- subtracting $\mu$ from --, therefor.

Signed and Sealed this
Fifteenth Day of November, 2022

Katherine Kelly Vidal
*Director of the United States Patent and Trademark Office*